Nov. 22, 1966          C. E. LIBBEY          3,286,957

FLEXIBLE WING DEPLOYMENT DEVICE

Filed June 30, 1964          3 Sheets-Sheet 1

INVENTOR
CHARLES E. LIBBEY

BY

ATTORNEYS

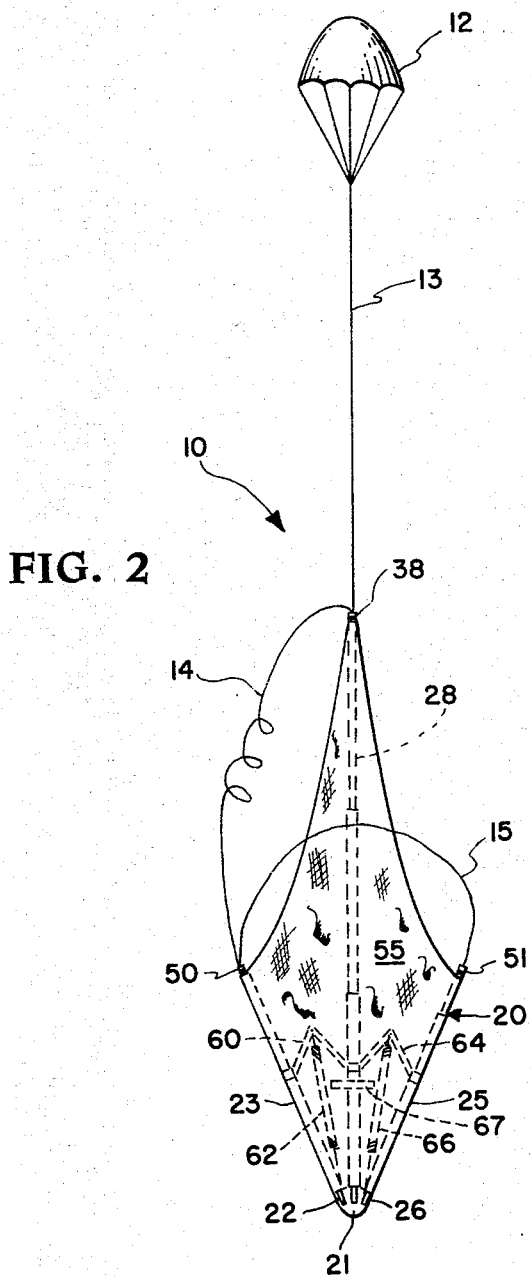

Nov. 22, 1966   C. E. LIBBEY   3,286,957
FLEXIBLE WING DEPLOYMENT DEVICE
Filed June 30, 1964   3 Sheets-Sheet 3

INVENTOR
CHARLES E. LIBBEY

BY
ATTORNEYS

United States Patent Office 3,286,957
Patented Nov. 22, 1966

3,286,957
FLEXIBLE WING DEPLOYMENT DEVICE
Charles E. Libbey, Newport News, Va., assignor to the United States of America as represented by the Administrator of the National Aeronautics and Space Administration
Filed June 30, 1964, Ser. No. 379,417
16 Claims. (Cl. 244—16)

The invention described herein may be manufactured and used by or for the Government of the United States of America for governmental purposes without the payment of any royalties thereon or therefor.

This invention relates to a deployment system for a flexible wing, and more particularly to a deployment system for a flexible wing wherein the superstructure of the wing is substantially rigid.

One of the advantages of the flexible wing is its capability to be packaged somewhat similar to a parachute and thereafter deployed to provide a lifting surface. One of the common arrangements for deployment of a flexible wing having semirigid superstructure is that of inflation. Although the inflation technique is satisfactory for a semi-rigid type of superstructure, it is not readily adaptable to an expandable rigid construction.

The flexible wing superstructure can be made in one piece units; however, this arrangement is not suitable for packaging since the structural members obviously have the same span as the wing itself. The superstructure members can be jointed and fold out to an extended position, but this requires additional structure for making the joints rigid. Spring type of structural members have been used to fold up or roll up and spring out on release. This is a reliable way of deployment, but is usually not suitable for large wing loading.

This invention overcomes the above described problems by providing a flexible wing arrangement which has telescoping superstructural members. The sections of the telescoping members nest together to satisfy the packaging requirement and are designed such that upon extension they lock upon each other to form the necessary rigid structure. Furthermore, the individual members can be hinged to a common point to further facilitate packaging. Deployment is accomplished by a system including a drogue parachute that extends the telescoping members sequentially and by a simple resiliently urged lever system which spreads the superstructure members.

It is, therefore, an object of this invention to provide a deployment means for a packageable flexible wing configuration which has rigid superstructural members.

Another object of this invention is to provide a flexible wing configuration having rigid superstructural members that are collapsible in at least two dimensions.

Yet another object of this invention is to provide a flexible wing configuration having rigid superstructural members which are collapsible, and are self-locking upon extension.

Another object of this invention is to provide a flexible wing configuration having extendable superstructural members, extension of the members being accomplished sequentially to assure locking in the extended position.

An additional object of the invention is to provide a deployment system for a flexible wing configuration which has a novel line rigging and severing arrangement for sequential deployment of the flexible wing.

A further object of this invention is to provide a flexible wing configuration having a packageable and deployable rigid superstructure which is of simple design facilitating an economical and highly reliable structure and deployment system.

Still another object of the invention is to provide a deployment system for a flexible wing configuration which has a combination of extendable and pivotal superstructural members deployable sequentially.

These and other objects and advantages of the invention will become more apparent upon reading the specification in conjunction with the accompanying drawings.

In the drawings:

FIG. 2 is a plan view of the flexible wing configuration showing the wing partially deployed in that the leading edge members are spreading and the keel is extended;

Basically, this invention relates to a deployment system for a flexible wing having rigid superstructure. The wing has a generally delta shaped planform and includes a nose section, keel and leading edge members. The leading edge members are hinged to the nose so that they may fold back against the keel. The keel and leading edge members are constructed of telescoping sleeves which may be contracted to facilitate packaging. The sections of the telescoping members are flared inwardly and outwardly on respective mating surfaces so that upon extension they jam forming a rigid superstructure member. A spring tensioned leverage system connected between the keel and the leading edge members spreads the leading edge members to the desired sweep angle upon deployment. The telescoping sections of the keel and leading edge members are extended sequentially by a drogue parachute and deployment line severing mechanism.

Figure 1:
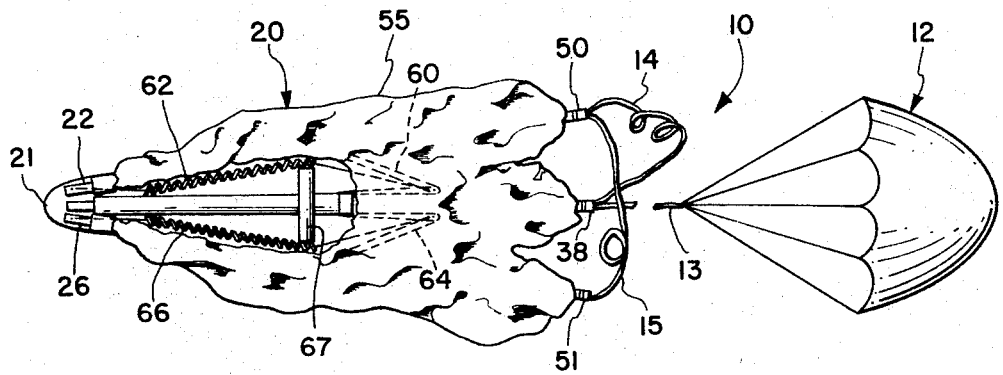
FIG. 1 is a plan view of the flexible wing shown in its partially collapsed or packageable condition, partially cut away to reveal the location of the spreader mechanism and showing the drogue chute deployed.

Referring now more specifically to the details of the invention, FIG. 1 shows a plan view of the flexible wing deployment assembly, designated generally by the reference numeral 10.

The deployment assembly 10 includes a drogue chute 12 connected to the keel of the flexible wing 20 by a main deployment line 13. The drogue chute 12 and main deployment line 13 are packaged with the flexible wing 20 and deployed in a conventional manner by conventional mechanism (not shown). The deployment line 13 has a branch line 14 connected to one of the leading edge members and a spur line 15 connected between the leading edge members for purposes which will be explained more fully hereinafter. A payload may be suspended from the flexible wing 20 by lines or a portion of the superstructure from the payload as the situation demands.

The specific flexible wing 20 (FIGS. 2 and 3) has a generally triangular shaped nose section 21, a pivotal connection 22 to which the telescoping leading edge member 23 is joined. The telescoping leading edge member 25 is also pivotally connected at 26 to the nose section 21. These members are located such that when they are spread to the fully deployed position they assume an angle of approximately 50 degrees (this angle may vary with design requirements) with respect to the keel now to be described.

Figure 5:
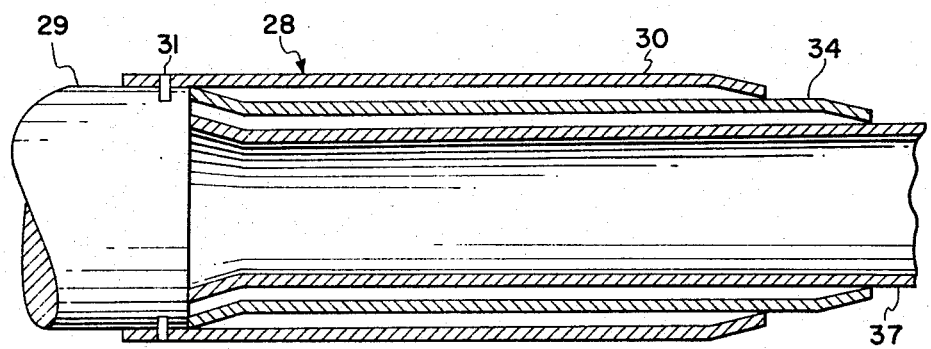
FIG. 5 is a cross-sectional view of a segment of the extendable portion of the flexible wing keel.
Figure 6:
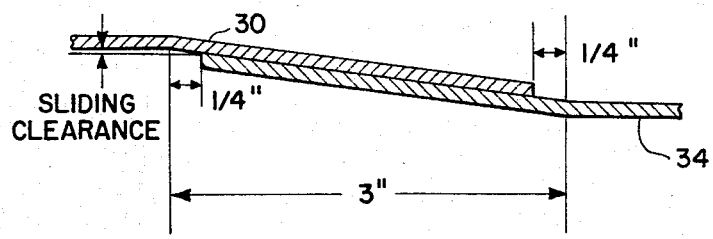
FIG. 6 is a cross-sectional view showing a portion of the telescoping tube members fully extended and locked.

The keel 28 is fixed to the nose section 21 by a post 29 in a conventional manner such as by welding. The post projects a small distance aft of the nose section and has fixed to it by pins 31 an outer sleeve 30. The outer sleeve 30 is a generally cylindrical shaped member with an inwardly flared or tapered outer or trailing end (FIG. 5). Housed within the outer sleeve 30 is an intermediate sleeve 34 and within the intermediate sleeve 34 an inner sleeve 37. Both the intermediate sleeve 34 and inner sleeve 37 have outwardly flared inner or leading ends and the intermediate sleeve 34 an inwardly flared outer end. The purpose for the flaring is apparent upon viewing FIG. 6 which shows the inwardly flared portion of one sleeve mating with the outwardly flared portion of the adjacent sleeve when fully extended. It should also be noted that the ends of the sleeves when fully extended move beyond the break point in the sleeve for the taper or flare and thereby are somewhat dimensionally displaced to provide a jamming action.

Figure 4:
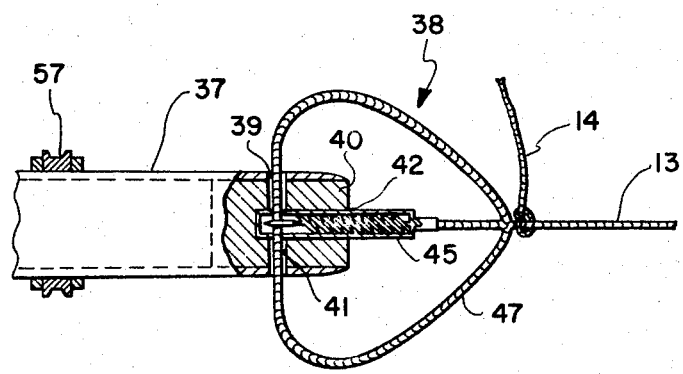
FIG. 4 shows an end segment of the flexible wing keel, partially cut away to reveal deployment line severing mechanism and wing material anchoring apparatus.

Although not described in detail, the leading edge members 23 and 25 are similarly designed, and each of the rear extremities of the inner sleeves carry deployment line release mechanism. This mechanism 38 is illustrated in detail by FIG. 4 and is shown associated with the inner sleeve 37 of keel 28. A plug 40 is fixed to the rear extremity of the inner sleeve 37 by means of pins, welding, or some other conventional fastening technique. The inner sleeve 37 has a pair of aligned apertures 39 which register with a plug cavity 41 formed through the plug. The plug 40 also has a bore 42 which is formed from the end of the plug through to the plug cavity and communicates therewith. A pyrotechnic cutting device 45 is fitted in the bore 42 and is designed so that the knife thereof intersects the plug cavity 41 upon actuation. The pyrotechnic cutting device 45 contains a time delay arrangement actuated mechanically, this entire cutting arrangement being known throughout the state of the art.

A deployment line loop 47 passes through the apertures 38 and the plug cavity 41 and is tied to the deployment line 13 above the pyrotechnic device 45. As is apparent in FIG. 4, when the pyrotechnic cutter 45 is energized the deployment line loop 47 is sheared or cut by the cutter freeing the deployment line from the telescoping member inner sleeve. A branch line 14 is tied or otherwise fastened to the deployment line 13 above the deployment line loop 47. The other end of the branch line 14 is tied above the deployment line loop of deployment line release 50 (FIG. 2) fixed to the leading edge member 23. This structure not shown in detail, but illustrated diagrammatically in FIG. 2 and is of the same design as deployment line release 38. The spur line 15 is tied to the branch line 14 and to the deployment line loop of deployment line release 51 fixed to the leading edge member 25. Structure 51 is also similar to deployment line release 38.

Attachment rings 57 (FIG. 4) surround and are fixed to the trailing ends of the inner sleeves of the telescoping leading edge members. They are used as anchors for the flexible wing skin now to be described.

The flexible wing material may consist of various materials such as sailcloth, nylon ripstop fabric, parachute cloth or any other flexible material which has the necessary strength and porosity qualities. The material has the form of a sweptback modified delta planform and has hems sewn in the leading edge portion and along the keel line to form channels which receive the telescoping leading edge members and keel. The material is fixed to the nose 21 and to attachment rings 57.

Figure 3:
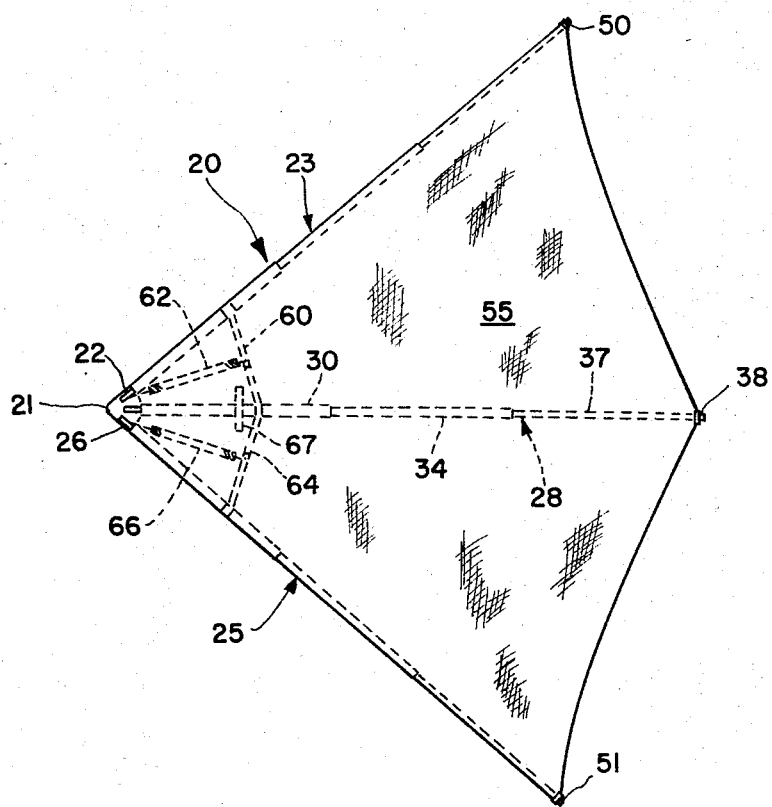
FIG. 3 is a plan view of the flexible wing configuration fully deployed and the drogue chute separated.

The mechanism for spreading the leading edge members upon deployment is illustrated in FIGS. 1, 2, and 3. This mechanism includes link pairs 60 and 64. The link pair 60 is pivotally joined at one of their ends and pivoted to the outer sleeve of leading edge member 23 and keel 28 respectively at their other ends. The link pair 64 is likewise pivotally joined at one end and pivoted to the outer sleeve of leading edge member 25 and keel 28 at the other end. The pivotal connections at the leading edge members and keels are made to collars which are frictionally clamped to the members. This arrangement is provided to prevent interference of the telescoping nature of the leading edge members and keel. A tension device 62 such as a spring or shockcord is fixed to the jointed ends of link pair 60 and to nose 21. A similar resilient member 66 is fixed to the link pair 64 and to the nose 21. As shown in FIG. 1, a lever arm 67 is clamped to the keel and projects perpendicularly a short distance from either side of the keel outer sleeve. The resilient members are entrained over the ends of the lever arm to provide a force component to initially spread the link pairs upon deployment. The link pairs 60 and 64 are designed to move slightly over center when fully expanded thereby forming a self-locking arrangement to maintain the wing planform.

*Operation*

The flexible wing 20 is initially folded in the nature shown in FIG. 1 and may be packaged together with the drogue chute 12 in a canister or other protective device (not shown). The wing may be connected to a payload by shroud lines or other means. When deployment is desired the drogue chute 12 is first released and may be utilized to pull the flexible wing 20 from the protective device as well as for deployment now to be described.

The drogue chute 12 as it engages the atmosphere applies a tension via deployment line 13 to the inner sleeve 37 of keel 28. This results in pulling the sleeves of the keel away from the nose section in the manner shown in FIG. 2. Sufficient force is applied by the drogue chute 12 to cause the telescoping members to fully extend and jam in the manner shown in FIG. 6. The fully extended keel then becomes a rigid member with no side or end play. The force applied by the drogue chute 12 also applies a tension to the pyrotechnic device 45 via the deployment line 13 thereby actuating a time delay switch. This time interval is set so that the keel is fully extended and locked before the explosive carried by the pyrotechnic device is fired. Upon firing of the explosive the outer blade forming a part thereof severs the deployment line loop 47 (FIG. 4) thereby releasing the drogue chute from the keel 28.

The branch line 14, however, is tied to the main deployment line 13 and to the deployment line release 50 associated with leading edge member 23. Thus, the drogue chute 12 now applies a force to the leading edge member 23 extending its telescoping sleeves and jamming them into the locked position. The pyrotechnic device then operates severing the deployment line from the leading edge member similarly to that described with respect to the keel.

The spur line 15 is tied to the branch line 14 which is still connected to the main deployment line 13. The drogue chute 12 now applies a force to the deployment line release mechanism 51 associated with leading edge member 25. The telescoping sections of leading edge member 25 are extended and locked and the pyrotechnic device triggered. The deployment line loop associated with it severed, thus completely releasing the drogue chute 12, branch line 14 and spur line 15 from the ends of the telescoping tubes. The telescoping keel and leading edge members are now fully extended and locked.

During the above sequence of events the leading edge members 23 and 25 are spread away from the keel 28. This is accomplished by the link pairs 60 and 64 and their associated resilient members 62 and 66. Due to the manner in which the resilient members are entrained over the ends of the lever arm 67, a leverage system is provided which initially opens the folded link pairs. Once the link pairs are opened a small amount, direct spring tension is sufficient to fully expand the pairs and the leading edge members. The link pairs are maintained in the expanded position by the tension of the springs and the overcenter design of the link pairs thereby maintaining the planform of the wing.

The flexible wing material 55 being secured to the attachment rings 57 on the telescoping members follows the deployment sequence to form the wing configuration. The wing is now fully deployed and may be utilized to carry the payload to the desired position.

From the above description it can be seen that a highly reliable deployment system for a rigid superstructure flexible wing type vehicle has been provided. The telescoping leading edge members and keel are designed such that a self-jamming union is made to provide rigid structural members comparable to that of rigid one-piece structural members. This type of construction also eliminates the need for any bearings or close tolerance fits in the telescoping sections except for the short flared portions at the ends. Thus, the telescoping sections can be made with a very loose fit and consequently have low friction between the sliding sections, requiring a minimum force to extend and lock them. The arrangement for sequentially deploying or extending the telescoping members is of simple design, highly reliable and foolproof. Also, with this arrangement the full force from the drogue chute is applied to the extension of each of the telescoping members. The tensioned link pair arrangement also provides a highly reliable and foolproof system for spreading the leading edge members relative to the keel. The entire deployment system is based on simple mechanical principles and structure which assures full deployment and guarantees operation on each deployment. Obviously, the advantages of the rigid superstructure for various applications is apparent. To mention a few of these advantages, the rigid superstructure is capable of greater load-carrying ability. Furthermore, a rigid structure is not susceptible to deflation as is the inflatable type superstructure. Furthermore, the superstructure is not dependent for deployment upon pressure systems including valve and other mechanisms of questionable reliability.

Since there are, obviously, many modifications and variations of the present invention possible in the light of the above teachings, it is therefore to be understood, that within the scope of the appended claims, the invention may be practiced otherwise than as specifically described.

What is claimed as new and desired to be protected by Letters Patent of the United States is:

1. A deployable flexible wing comprising: rigid flexible wing superstructure means; flexible wing material fixed to said superstructure to form a lift surface; means rendering said rigid flexible wing superstructure collapsible in at least two dimensions to facilitate packaging before flight; and means for sequentially extending said rigid flexible wing superstructure to form said flexible wing.

2. A deployable flexible wing comprising: rigid flexible wing superstructure; flexible wing material fixed to said superstructure for forming a lift surface; said superstructure including extendable leading edge members and keel to facilitate packaging before flight; and means for sequentially extending said leading edge members and keel to form said flexible wing.

3. A deployable flexible wing as in claim 2 wherein said leading edge members and keel are telescoping members.

4. A deployable flexible wing comprising: rigid flexible wing superstructure; flexible wing material fixed to said superstructure to form a lift surface; said superstructure including telescoping leading edge members and keel to facilitate packaging before flight; said telescoping members having inner engaging ends dimensioned so as to lock the leading edge and keel members in the extended positions; and means for extending said leading edge members and keel to form said flexible wing.

5. A deployable flexible wing comprising: rigid flexible wing superstructure; flexible wing material fixed to said superstructure to form a lift surface; said superstructure including telescoping extendable leading edge members and keel to facilitate packaging before flight; said telescoping members having inner engaging ends which change dimensionally so as to lock the members in the extended position; and means for extending said leading edge members and keel to form said flexible wing.

6. A deployable flexible wing comprising: rigid flexible wing superstructure; flexible wing material fixed to said superstructure to form a lift surface; said superstructure including telescoping extending leading edge members and keel to facilitate packaging before flight; said telescoping members having sleeves with inwardly and outwardly flared ends; said flared ends mating upon extension and moving beyond a break point forming the flare thereby jamming and locking the sleeves in the extended position and means for extending said leading edge members and keel to form said flexible wing.

7. A deployable flexible wing comprising: rigid flexible wing superstructure; flexible wing material fixed to said superstructure to form a lift surface; said superstructure including extendable leading edge members and keel to facilitate packaging before flight; and drogue parachute means for extending said leading edge members and keel to form said flexible wing.

8. A deployable flexible wing as in claim 2 wherein said flexible wing superstructure has a nose section; said leading edge members being movably connected to said nose section to facilitate packaging.

9. A deployable flexible wing as in claim 8 wherein said movable connection is a pivotal connection.

10. A deployable flexible wing as in claim 7 wherein said drogue parachute means sequentially extends said keel and leading edge members; and means for sequentially severing lines connected to said drogue parachute and to said keel and each of said leading edge members after extension thereof.

11. A deployable flexible wing comprising: rigid flexible wing superstructure; flexible wing material fixed to said superstructure to form a lift surface; said superstructure including extendable leading edge members and keel to facilitate packaging before flight; said flexible wing superstructure having a nose section; said leading edge members being pivotally connected to said nose section; link pairs pivotally joined at their ends and respectively to the keel and one of the leading edge members; resilient means fixed to said link pairs and said nose section; an arm fixed to said keel and projecting beyond said joined link pairs ends when collapsed against said keel; said resilient means being directed over the ends of said arm forcing initial movement of said link pairs upon deployment of said flexible wing and means for extending said leading edge members and keel to form said flexible wing.

12. A deployable flexible wing comprising: rigid flexible wing superstructure; flexible wing material fixed to said superstructure to form a lift surface; said superstructure including extendable leading edge members and keel to facilitate packaging before flight; said flexible wing superstructure having a nose section; said leading edge members being pivotally connected to said nose section; link means connected to said keel and leading edge members; leverage means fixed to said keel, and resilient means secured to said nose section and link means; said resilient means being associated with said leverage means such that said link means is initially expanded upon deployment and thereafter fully expanded by said resilient means and means for extending said leading edge members and keel to form said flexible wing.

13. A deployable flexible wing as in claim 7 wherein a first line is tied to said parachute and to said keel; means for severing said line from said keel after extension thereof; a second line tied from said first mentioned line to one of said leading edge members; means for severing said second line from said leading edge member after extension thereof; a third line tied from said second line to said other leading edge member; and means for severing said third line from said other leading edge member after extension thereof.

14. A deployable flexible wing comprising: rigid flexible wing superstructure; flexible wing material fixed to said superstructure to form a lift surface; said superstructure including telescoping extendable leading edge members and keel to facilitate packaging before flight; inner-engaging ends of said telescoping members being dimensioned so as to lock the keel and leading edge members in the extended position; drogue paracute means for extending said keel and leading edge members to form said flexible wing; a first line tied to said parachute and to said keel; means for severing said line from said keel after extension thereof; a second line tied from said first mentioned line to one of said leading edge members; means for severing said second line from said leading edge member after extension thereof; a third line tied from said second line to said other leading edge member; and means for severing said third line from said other leading edge member after extension thereof whereby said keel and leading edge members are extended sequentially by said drogue parachute to assure locking of the telescoping parts thereof.

15. A deployable flexible wing comprising: a flexible wing superstructure including a telescoping keel, leading edge members and a nose section; said leading edge members being pivotally connected to said nose section; link means joining said keel and leading edge members; leverage means fastened to said keel; resilient means secured to said nose section and link means and being associated with said leverage means to initially expand said link means upon deployment and said resilient means thereafter fully expanding said link means; drogue parachute means for extending said telescoping keel and leading edge members; said drogue parachute means sequentially extending said keel and leading edge members; and means for sequentially severing lines connected to said keel and each of said leading edge members after extension thereof.

16. A deployable flexible wing comprising: a flexible wing superstructure including a telescoping keel, leading edge members and a nose section; said leading edge members being pivotally connected to said nose section; inner-engaging ends of said keel and leading edge members changing dimensionally to lock said keel and leading edge members in the extended position; link pairs pivotally joined at their ends and respectively to the keel and one of the leading edge members; resilient means fixed to said link pairs and to said nose section; an arm fixed to said keel and projecting beyond said link pairs joined end when collapsed against said keel; said resilient means being directed over the ends of said arm forcing initial movement of said link pairs upon deployment of said flexible wing and thereafter full expansion of said link pairs; drogue parachute means for extending said telescoping keel and leading edge members; a first line tied to said parachute and to said keel; means for severing said line from said keel after extension thereof; a second line tied from said first mentioned line to one of said leading edge members; means for severing said second line from said leading edge member after extension thereof; a third line tied from said second line to said other leading edge member; and means for severing said third line from other leading edge member after extension thereof whereby said keel and leading edge members are extended sequentially by said drogue parachute to assure locking of said members.

References Cited by the Examiner

UNITED STATES PATENTS

| | | | |
|---|---|---|---|
| 3,185,412 | 5/1965 | Rogallo | 244—138 X |
| 3,198,458 | 8/1965 | Fink | 244—49 |

OTHER REFERENCES

NASA TN D-1932 Free-Flight Investigation of the Deployment, Dynamic Stability, and Control Characteristics of a 1/12 Scale Dynamic Radio-Controlled Model of a Large Booster and Parawing, pp. 1–13, August 1963.

Rogallo, F. M.: Flexible Wing Research and Development, NASA Langley Research Center, Langley Station, Hampton, Va., November 13–14, 1962, page 4.

FERGUS S. MIDDLETON, *Primary Examiner.*

MILTON BUCHLER, *Examiner.*

A. E. CORRIGAN, *Assistant Examiner.*